July 28, 1959 J. P. SLATTERY ET AL 2,896,886

MOTOR MOUNT

Filed Oct. 28, 1957

INVENTORS
JOHN P. SLATTERY
& ELMER E. HEIMO
BY
THEIR ATTORNEY

United States Patent Office 2,896,886
Patented July 28, 1959

2,896,886

MOTOR MOUNT

John P. Slattery, Louisville, Ky., and Elmer E. Heimo, Erie, Pa., assignors to General Electric Company, a corporation of New York Application October 28, 1957, Serial No. 692,731

3 Claims. (Cl. 248—15)

The present invention relates to, and has as its principal object the provision of, a new and improved support structure for supporting a motor in spaced relationship to a support panel which structure automatically clamps the end of the motor securely into place when the structure is attached to the panel.

In accordance with the present invention there is provided a mounting structure for supporting one end of a motor with respect to a support panel such that the motor is arranged with its axis of rotation approximately normal to the panel. The structure includes a clamping ring adapted to slide over an axial extension which forms a part of the end of the motor. The ring is provided with a short gap therein for permitting the ring to become contracted around the axial extension. Spaced around the ring and rigidly attached thereto are a plurality of arms extending radially outward from the ring and formed so that the ends thereof are in abutting relationship with the panel. The two arms attached to the ring on opposite sides of the gap have their ends abutting the panel at a particular distance apart. Securing means are provided on the panel for securing the ends of the arms to the support panel. In order to clamp the motor into position, the securing means for attaching the two arms extending from opposite sides of the gap are spaced a shorter distance apart than the ends of these opposite arms. Upon attaching these opposite arms to the panel the clamp ring is forced to contract around the axial extension thereby clamping the motor into position with respect to the panel.

For a better understanding of the invention reference may be had to the accompanying drawings in which.

Figure 1:
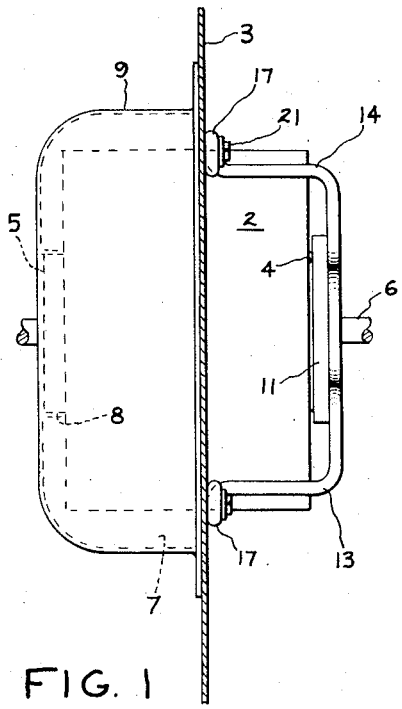
Fig. 1 is a side elevation view showing the mounting structure of the present invention.

Referring now to Fig. 1 there is shown a motor 2 which is mounted with its axis of rotation approximately perpendicular to a support panel 3 and which is securely held in this position with respect to the support panel by the support structure of the present invention. The particular construction of the motor forms no part of the invention and construction illustrated in not intended to limit the invention since the motor could take on any of a number of configurations so long as it contains an axial extension or bearing hub which may be clamped into the support structure in a manner to be hereinafter explained.

In the present illustration, the motor is provided with a pair of axial extensions or annular collars 4 and 5 which contain the bearings through which the shaft 6 is journalled and which provide support for the rotating parts of the motor. As may best be seen in Fig. 2, the motor extends through a hole 7 formed in the panel 3 with the axial extension 5 of the motor being inserted into and supported by a circular shoulder 8 formed in an end-bell or cup-like member 9 which is attached to the support panel 3 in any well-known manner, such as by welding or by means of bolts or screws. Obviously, by forming the support panel 3 such that its configuration includes a section resembling the cup-like member 9, it would be possible to eliminate the cup-like member 9, but for purposes of illustration the assembly has been shown as two separate parts.

In accordance with the present invention there is provided, for supporting the other end of the motor, a motor support and clamping means which automatically clamps the motor into place when the support structure is connected to the support panel. More specifically, there is provided a clamping ring 11 having a slightly greater inner diameter than the outer diameter of the axial extension 4 thereby permitting it to slide over the outer circumference of the axial extension. The clamping ring 11 is provided with a gap 12 for permitting the clamping ring to be slightly contracted around the axial extension. For supporting the ring in spaced relation with respect to the support panel 3, there are provided a plurality of arms 13, 14, 15 and 16 which extend radially outward from the ring and are rigidly attached thereto. In the present embodiment of the invention, the arms are welded to the ring 11 and are uniformly spaced around the ring. The arms, in the present illustration, are formed of two lengths of wire rod material with each rod forming two arms. Thus, the arms 15 and 16 are formed of the same rod and arms 13 and 14 are formed of a second rod. This particular construction forms a very sturdy structure and permits the arms to be easily attached to the ring. However, the arms could be formed singly of separate rods and attached by welding to the clamping ring and the structure would conceivably operate just as well. However, the particular construction illustrated is felt to be much sturdier and does not place too much stress on the weld connections between the ring and the arms of the structure.

Figure 2:
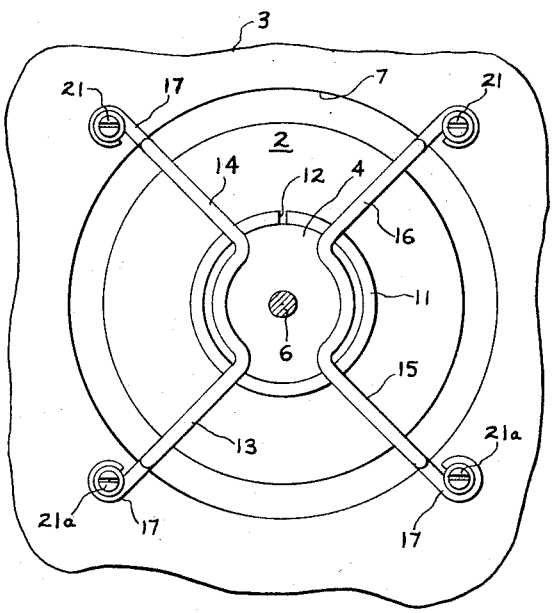
Fig. 2 is a front elevation view illustrating the spider-like arrangement of the arms of the mounting structure.
Figure 3:
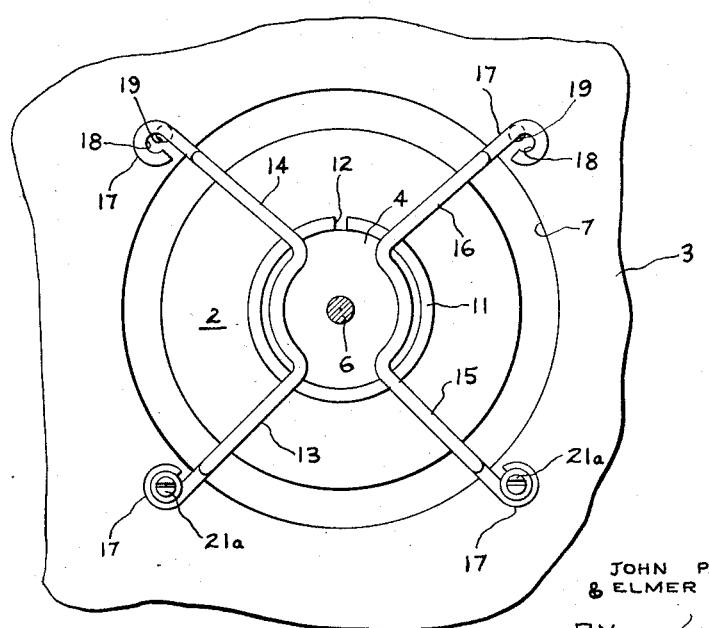
Fig. 3 is a front elevation view similar to that of Fig. 2 showing the mounting structure in its unclamped position.

As may be seen in Figs. 2 and 3, the arms extend radially outward from the ring along the motor and are bent in spider-like fashion around the outer periphery of the motor but spaced therefrom with the ends 17 of the arms abutting the support panel 3. Each of the ends 17 is bent to form a fastener receiving aperture or bolt hole 18 for attaching the support structure to the panel 3. Securing means are provided on the support panel 3 for fastening the arms of the structure to the panel. More specifically, as may best be seen in Fig. 3, the support panel is provided with a plurality of holes 19 through which fastening members or bolts 21 are placed for attaching the ends of the arm to the panel. Referring now to Fig. 3, when the clamping ring 11 is in its uncontracted state, the ends 17 of the arms 14 and 16, which extend from the ring on opposite sides of the gap 12, are spaced a particular distance apart. The fastening means for securing these arms to the panel, or the holes 19, are spaced a shorter distance apart than the holes 18 of the arms 14 and 16 making it necessary to move the arms 14 and 16 to align the holes 18 with the holes 19 of the panel. When the arms 14 and 16 are moved for this purpose, the clamp ring 11 is contracted and the gap 12 is slightly closed thus causing the ring 11 to give a clamping effect on the axial extension 4. Thus, when the bolts 21 are tightened into place through the holes 19 of the panel and the aligned holes 18 of the arms 14 and 16 of the mounting structure, the clamping ring 11 automatically clamps the axial extension 4 into place.

In actual assembly of the structure to the support panel 3, it has been found convenient to make the bolt holes in the panel, through which the arms 13 and 15 are connected to the panel, line up with the holes in the ends of the arms 13 and 15. The support structure is then mounted on the panel 3 with the bolts 21a extending through the aligned holes but not tightened into place. It is then a simple matter to place the clamping ring 11 over the axial extension 4 and align the arms 14 and 16 such that the bolt holes 18 in these arms align with the bolt holes 19 in the panel and then insert the bolts 21 to secure the structure and the motor into place. It might, under some circumstances be desirable to offset the bolt holes in the panel 3 from the bolt holes in the arms 13 and 15 so that these arms also force the clamp ring to contract when they are moved such as to align the holes. However, that has been found to be unnecessary in the illustrated embodiment where there are four arms equally spaced around the ring.

An advantage of this mounting means, other than its automatic clamping feature, is that the spider-like arms which support the clamping ring 11 serve to partially absorb vibrations which are transmitted to the ring through the axial extension 4. This helps prevent the transmission of these vibrations to the support panel 3. It should also be noted that it is possible, when the conditions permit, to mount both ends of the motor by means of this mounting structure. For example, it is possible to replace the cup-like member 9 with the mounting structure of the present invention thereby clamping both axial extensions 4 and 5 in a pair of clamping rings 11 with the radially extending arms of each mounting structure attaching to opposite sides of the panel 3.

By the present invention there has been provided a mounting structure for supporting the end of the motor in an approximately perpendicular position with respect to a support panel. Moreover, the end of the motor is automatically and securely clamped into position as the mounting structure is attached to the support panel.

While in accordance with the patent statutes there has been described what at present is considered to be the preferred embodiment of the invention, it will be obvious to those skilled in the art that various changes and modifications may be made therein without departing from the invention, and it is, therefore, the aim of the appended claims to cover all equivalent variations that fall within the true spirit and scope of the invention.

What we claim as new and desire to secure by Letters Patent of the United States is:

1. In combination with a motor having a pair of annular collars extending from opposite ends thereof, a mounting and clamping assembly comprising a support panel, means attached to said support panel and fitting around one of said annular collars of said motor for supporting one end of said motor with the shaft thereof approximately normal to said panel, a clamping ring adapted to receive said other annular collar, said clamping ring having a gap therein to permit the contraction of said ring around said other annular collar, a plurality of arms arranged in spaced relation around said clamping ring and rigidly attached thereto, said arms extending in spider-like fashion outward from said ring and around the outer periphery of said motor with said arms formed so that the ends thereof abut said support panel to retain said ring and said motor in spaced relationship with respect to said panel, at least two of said arms extending from said ring on opposite sides of said gap, said aforementioned two arms having their ends abutting said panel at a particular distance apart when said ring is in the uncontracted state, and securing means on said panel for connecting the outwardly extending ends of each of said arms to said panel, said securing means on said panel for connecting said aforementioned two arms being spaced a shorter distance apart than the particular distance separating said ends of said two arms when said ring is in said uncontracted state whereby upon moving said two arms to align the ends thereof with said securing means for attaching said arms to said panel said clamping ring is forced to contract around said axial extension and secure said motor into position.

2. In combination with a motor having a pair of annular collars extending axially from the ends thereof, a mounting and clamping assembly comprising a support panel having an aperture larger than the outer periphery of said motor through which said motor extends, means attached to one side of said support panel and fitting around one of said annular collars of said motor for supporting one end of said motor with said motor positioned axially through said aperture in said panel, a clamping ring positioned around said other annular collar, said clamping ring having a gap therein to permit contraction of said ring around said other annular collar, a plurality of radially extending arms arranged in spaced relation around said clamping ring and rigidly attached thereto, said arms extending outwardly in spider-like fashion around said motor but spaced therefrom and having ends abutting against the other side of said support panel, two of said arms extending from opposite sides of said gap of said ring having their ends spaced a particular distance apart when said ring is in the uncontracted state, said ends of all of said arms having bolt holes formed therein, said support panel having a plurality of bolt holes therein, two of said bolt holes in said support panel being spaced a shorter distance apart than the particular distance separating said ends of said aforementioned two arms whereby movement of said two arms to align said bolt holes in said two arms with said bolt holes in said support panel causes said clamping ring to contract and clamp around said axial extension, and a plurality of bolts securing said radially extending arms to said panel thereby clamping said motor into position with said motor extending axially through said hole in said panel.

3. In combination with a motor having a pair of annular collars extending axially from opposite ends thereof, a mounting and clamping assembly comprising a support panel having an aperture larger than the outer periphery of said motor through which said motor extends with the shaft of said motor approximately normal to said support panel, an end-bell attached around the outer circumference of said aperture on one side of said panel and provided with shoulders thereon for supporting one of said annular collars of said motor, means on the opposite side of said panel for supporting the other end of said motor, a clamping ring adapted to receive said other annular collar, said clamping ring having a gap therein to permit contraction of said ring around said other annular collar, a plurality of radially extending arms arranged around said clamping ring and rigidly attached thereto, at least two of said arms being spaced equi-distant on opposite sides of said gap, all of said arms extending outwardly in spider-like fashion around said motor but spaced therefrom and having ends which abut against said opposite side of said support panel, said ends of all of said arms having bolt holes formed therein, said aforementioned two arms having ends spaced a particular distance apart when said ring is in the uncontracted state, said support panel having a plurality of bolt holes therein with two of said holes in said support panel being spaced a shorter distance apart than said ends of said aforementioned two arms extending from opposite sides of said gap, said remaining bolt holes in said panel aligning with said bolt holes in said remaining arms extending from said ring whereby movement of said two arms to align said bolt holes in said two arms with said bolt holes in said support panel causes said clamping ring to contract and clamp around said axial extension, and a plurality of bolts extending through said aligned holes for securing said support structure and said end of said motor into position.

References Cited in the file of this patent
UNITED STATES PATENTS

| | | |
|---|---|---|
| 1,727,701 | Elder | Sept. 10, 1929 |
| 2,616,643 | Budd | Nov. 4, 1952 |